United States Patent [19]

Deininger

[11] Patent Number: 5,246,484
[45] Date of Patent: Sep. 21, 1993

[54] PROCESS FOR REDUCING NONFERROUS METAL OXIDES IN SLAGS

[75] Inventor: Lutz Deininger, Boetgen, Fed. Rep. of Germany

[73] Assignee: Metallgesellschaft Aktiengesellschaft, Frankfurt am Main, Fed. Rep. of Germany

[21] Appl. No.: 851,523

[22] Filed: Mar. 16, 1992

[30] Foreign Application Priority Data

Mar. 16, 1991 [DE] Fed. Rep. of Germany ....... 4108687

[51] Int. Cl.$^5$ .............................................. C22B 13/00
[52] U.S. Cl. .......................................... 75/585; 75/695
[58] Field of Search .................................. 75/695, 585

[56] References Cited

U.S. PATENT DOCUMENTS

| | | | |
|---|---|---|---|
| 3,711,275 | 1/1973 | Johnsson | 75/501 |
| 3,723,096 | 3/1973 | Parlee et al. | |
| 3,832,163 | 9/1974 | Themelis et al. | |
| 3,892,559 | 7/1975 | Quarm | |
| 4,266,971 | 5/1981 | Schwartz et al. | |
| 4,362,561 | 12/1982 | Weigel et al. | |
| 4,663,207 | 5/1987 | Kupersmit | |
| 4,741,770 | 5/1988 | Andrews et al. | |
| 4,895,595 | 1/1990 | Fischer | |

FOREIGN PATENT DOCUMENTS

| | | |
|---|---|---|
| 503937 | 9/1979 | Australia . |
| 2722915A1 | 11/1978 | Fed. Rep. of Germany . |
| 81040 | 3/1979 | Luxembourg . |
| 1178120 | 1/1970 | United Kingdom . |

OTHER PUBLICATIONS

Chemical and Process Technology Encyclopedia, p. 213 Considine, McGraw-Hill (1974).

P. Fischer et al; Journal of Metals, vol. 34 (1982) No. 6, Warrendale, Pa., U.S.; "The Present Status of Development Of The QSL-Lead Process".

P. E. Queneau; Journal of Metals, vol. 41 (1989) No. 12, Warrendale, Pa., U.S.; "The QSL Reactor For Lead And Its Prospects for Ni, Cu and Fe".

*Primary Examiner*—Melvyn J. Andrews
*Attorney, Agent, or Firm*—Herbert Dubno; Jonathan Myers

[57] ABSTRACT

In the reduction of liquid slags or molten salts which contain nonferrous metal oxides and are disposed over a liquid metal layer consisting of the corresponding nonferrous metal oxides and are disposed over a liquid metal layer consisting of the corresponding nonferrous metal, carbonaceous reducing agents and oxygen-containing gas are injected through nozzles into the metal layer. In order to improve the gasification of the reducing agent the height of the metal layer is so selected that at least 50% of the reducing agent are reacted to CO and optionally $H_2$ in the metal layer before the reducing agent enters the slag layer.

7 Claims, No Drawings

PROCESS FOR REDUCING NONFERROUS METAL OXIDES IN SLAGS

FIELD OF THE INVENTION

My present invention relates to a process for reducing liquid slags or molten salts which contain nonferrous metal oxides and are disposed over a liquid metal layer consisting of the corresponding nonferrous metal, in which process carbonaceous reducing agents and oxygen-containing gas are injected through nozzles into the metal layer.

BACKGROUND OF THE INVENTION

A number of pyrometallurgical processes of nonferrous metallurgy involve the formation of slags which have a considerable content of a nonferrous metal oxide, which must be reduced in the slag if the nonferrous metal is to be recovered.

To effect that reduction, reducing substances are introduced into the slag layer. The reduced nonferrous metal will either be in a liquid state and will settle or it will be evaporated.

The reducing agents can consist of solid, gaseous or liquid carbonaceous substances and are injected together with oxygen-containing gases into the slag layer through nozzles or lances. Solid reducing agents consist of fine-grained coal or coke. Natural gas is mainly used as a gaseous reducing agent and mainly light fuel oil as a liquid reducing agent. The reducing agents react with the oxygen to form CO and $H_2$, by which the reduction is effected.

U.S. Pat. No. 4,266,971 and U.S. Pat. No. 4,895,595 disclose the QSL process for a direct recovery of lead from sulfide ores in an elongate horizontal reactor, in which metallic lead and a high-PbO slag phase are produced in the oxidizing zone. In the reducing zone a reducing agent in a solid liquid or gaseous state and an oxygen-containing gas are injected through bottom-blowing nozzles into the slag phase. The secondary lead thus formed flows immediately into the reducing zone and is combined therein with the primary lead.

U.S. Pat. No. 3,663,207 discloses a process for a direct recovery of lead in an elongate horizontal reactor in which a high-ZnO slag flows into the slag zone, in which natural gas or fine-grained coal are injected as reducing agents through laterally arranged nozzles into the slag so that ZnO and residual PbO are reduced and volatilized.

U.S. Pat. No. 4,741,770 discloses a method of processing mixed sulfide concentrates, which contain mainly zinc but contain also lead and copper. A matte phase which is rich in copper oxide is maintained in the oxidizing zone and the concentrate which has been fed is reacted with injected oxygen to form a slag, which contains ZnO and PbO. Coal and oxygen are injected through lateral nozzles into that slag in the reducing zone so that zinc and lead are volatilized.

U.S. Pat. No. 4,362,561 discloses a process in which the sulfide material can be melted in a melting cyclone and is discharged onto the oxidizing zone of the elongate reactor and reducing gases are blown onto the slag through lances in the reducing zone. Propane and oxygen are used, for instance, for that purpose.

U.S. Pat. No. 3,832,163 discloses a process in which sulfide copper ores are charged onto a molten bath in the oxidizing zone of an elongate reactor and are melted in that air is injected into the bath and in which reducing gases are injected through laterally disposed nozzles or through lances in the slag in the reducing zone.

U.S. Pat. No. 3,892,559 discloses a process in which copper- and zinc-containing ores, coal and air are injected through lateral nozzles into a slag bath in an elongate reactor, whereafter the resulting liquid copper matte is tapped off and the zinc is volatilized.

U.S. Pat. No. 3,723,096 discloses a process in which iron-containing nonferrous metal materials can be melted in an elongate reactor under oxidizing conditions and the nonferrous metal is reduced in a reducing zone, in which a reducing agent, such as hydrogen or coal, is blown onto the slag bath.

In all of these processes the reducing agent together with the oxygen-containing gas is either directly injected into the slag layer or is injected into the slag through a metal layer which is provided on the bottom of the reactor and is as thin as possible. But the reducing action of the reducing agent on the slag is unsatisfactory in many cases so that the reducing agent must be used in a large surplus and this may give rise to difficulties in the operation.

OBJECT OF THE INVENTION

It is an object of the invention to provide a technically simple and economical process by which nonferrous metal oxides contained in liquid slags or molten salts can be reduced to a very high degree.

DESCRIPTION OF THE INVENTION

This object is accomplished in accordance with the invention in that the height of the metal layer is so selected that at least 50% of the reducing agent is reacted to CO and optionally $H_2$ in the metal layer before the reducing agent enters the slag layer.

More particularly, the invention comprises the steps of:

(a) injecting a carbonaceous reducing agent and an oxygen-containing gas through nozzles into the metal layer;

(b) controlling a height of the metal layer is so selected that at least 50% of the reducing agents are reacted to CO and optionally $H_2$ in the metal layer before the reducing agent enters the overlying slag layer or molten salt; and (c) reducing the slag or molten salt, overlying the metal layer with reducing agent which does not react in the metal layer, the CO and the $H_2$.

The carbonaceous reducing agent which is employed may consist of fine-grained coal or coke, gaseous hydrocarbons, particularly natural gas, and liquid hydrocarbons, particularly light fuel oil. Mixtures may also be used.

The oxygen-containing gas employed may consist of oxygen, oxygen-enriched air or air. The rate at which oxygen contained in the oxygen-containing gases is introduced is so selected that the desired percentage of the reducing agent will be reacted in the metal layer to CO and optionally $H_2$.

$H_2$ will be formed if hydrocarbons are used or by the reaction volatile components of coal.

The injection into the metal layer may be effected through bottom-blowing nozzles or laterally disposed nozzles or through lances which extend through the slag layer from above. The shape of the reactor in which the process is carried out may be selected within a wide range. However, the reactor should be so designed that in case of an interruption of the injection the reactor can be rotated to move the nozzles out of the bath, as is possible in the case of elongate horizontal reactors or drums, which can be rotated about their longitudinal axis until the nozzles have been moved out of the molten bath.

The height which will be required for the metal layer to achieve the desired reaction of the reducing agent in the metal layer will depend on the nature of the reducing agent, the nature of the oxygen-containing gas, the metal which constitutes the metal layer, the temperature of the metal layer and the force and velocity of the injected jets. The required height can empirically be ascertained for any given application in a relatively simple manner.

A strong consumption of the mouthpieces of the nozzles can be prevented by injecting a protective gas as a shell gas from multipassage nozzles. The reducing gas produced by the reaction and containing CO and $H_2$ is strongly heated in the metal layer so that the gas will be at a correspondingly high temperature as it enters the slag and particularly good reducing conditions will thus be obtained. Besides, if the previous reaction has been incomplete, that high temperature will promote a further reaction to CO and $H_2$ in the slag layer.

The gasification or reaction of the carbonaceous reducing agent can be effected, in principle, in all molten nonferrous metals so that the process may be applied also to all nonferrous metals which are produced by carbothermal processes.

The process is also applicable to processes of fused-salt electrolysis if there is an electrochemical recovery of oxygen.

In addition to the predominating metal, the liquid metal layer may contain other nonferrous metals and impurities. The temperature of the metal layer should be as high as possible and should exceed about 650° C. Because the temperature of the metal layer will mainly be determined by the temperature of the supernatant slag layer, that temperature will usually be correspondingly higher.

According to a preferred feature of the invention, at least 80% and preferably more than 90% of the reducing agent are thus reacted in the metal layer. A reaction to that degree in the metal layer will result in a very good reducing action in the slag even if the reducing agent is used in a relatively small surplus and the remaining combustible constituents of the gas emerging from the slag can generally be combusted in the free space in the reactor and can thus be utilized to heat the slag layer.

According to another feature of the invention, part of the reducing agent is combusted in the metal layer to form $CO_2$ and optionally $H_2O$ and the quantity of heat which is consumed in the metal layer by the injected reducing agent is substantially compensated by the heat thus generated. This will avoid in a simple manner a cooling of the metal layer at the injection points.

According to a further feature, methane is injected as a reducing agent and the cracking of methane is promoted in that oxygen and/or water vapor is added. This will achieve a fast and effective reaction.

Furthermore, the lead layer existing in the reducing zone of a QSL reactor over the bottom-blowing nozzles advantageously has a height of at least 4 cm, preferably in excess of 10 cm. In the QSL process the secondary lead produced in the reducing zone flows into the oxidizing zone immediately. To maintain the desired height of the layer in the reducing zone to reactor may be horizontally disposed and the height of the lead bath in the oxidizing zone may be so controlled that the lead layer in the reducing zone will always have the desired height. Alternatively, a weir may be provided on the bottom in the reducing zone so that the lead layer retained by the weir will have the desired height. These heights will result in very good operating conditions in the reducing zone.

The advantages afforded by the invention reside particularly in that the relatively high thermal conductivity and thermal penetrating power $$\sqrt{\frac{\text{heat conductivity} \times \text{heat capacity}}{\text{volume}}}$$

of molten metal will result in a spontaneous production of the reducing gases if solid, liquid or gaseous carbonaceous materials are injected into the molten metal. In addition, the reducing gas entering the slag will have been heated to the temperature of the molten bath so that very good reducing conditions will be obtained. This will also result in a very high utilization of the reducing gas.

I claim:

1. A process for reducing liquid slags or a molten salt which contains nonferrous metal oxides and which are disposed over a liquid metal layer consisting of the corresponding nonferrous metal, comprising the steps of:
    (a) injecting a carbonaceous reducing agent, capable of producing CO or CO and $H_2$ upon contact with an oxygen-containing gas, and an oxygen-containing gas through nozzles into the metal layer;
    (b) controlling a height of the metal layer so selected that at least 50% of the reducing agent is reacted to form CO or CO and $H_2$ in the metal layer before the carbonaceous reducing agent enters the overlying slag layer or molten salt; and
    (c) reducing the slag or molten salt, overlying said molten layer with carbonaceous reducing agent which does not react in said metal layer, and with the CO or the CO and the $H_2$.

2. The process defined in claim 1 wherein at least 80% of the reducing agent is reacted in the metal layer.

3. The process defined in claim 2 wherein at least 90% of the reducing agent is reacted in the metal layer.

4. The process defined in claim 1 wherein according to step (a) a part of the carbonaceous reducing agent is further combusted in the metal layer to form $CO_2$ or $CO_2$ and $H_2O$ and a quantity of heat which is consumed in the metal layer by the injected carbonaceous reducing agent, but which is substantially compensated by the heat generated by the formation of $CO_2$ or $CO_2$ and $H_2O$.

5. The process defined in claim 1 wherein methane is injected as said reducing agent and the cracking of methane is promoted by addition of oxygen or water vapor thereto.

6. The process defined in claim 1 wherein the metal layer is a lead layer in a reducing zone of a QSL reactor over bottom-blowing nozzles thereof and has a height controlled to be at least 4 cm.

7. The process defined in claim 6 wherein said height is controlled to be in excess of 10 cm.

* * * * *